Dec. 22, 1959 L. HAWORTH 2,918,252

TURBINE ROTOR DISC STRUCTURE

Filed Dec. 16, 1955 2 Sheets-Sheet 1

Dec. 22, 1959 L. HAWORTH 2,918,252

TURBINE ROTOR DISC STRUCTURE

Filed Dec. 16, 1955 2 Sheets-Sheet 2

United States Patent Office 2,918,252

Patented Dec. 22, 1959

2,918,252

TURBINE ROTOR DISC STRUCTURE

Lionel Haworth, Littleover, England, assignor to Rolls-Royce Limited, Derby, England, a British company Application December 16, 1955, Serial No. 553,586

Claims priority, application Great Britain December 24, 1954

7 Claims. (Cl. 253—39)

This invention relates to turbine rotors for gas-turbine engines and concerns primarily turbine rotor disc constructions.

Heretofore in gas-turbine engines, it has been usual to provide a separate disc structure for each row of rotating blades of the turbine, the blades being mounted at the periphery of the disc structure, and in multi-stage turbines the disc structures of more than one row of rotor blades have been drivingly connected together at or near their centres. Usually, the turbine disc structure associated with a row of blades is a solid forging although it has been proposed to form the disc structure as a pair of forged disc members which are clamped together to grip the root ends of the turbine blades between their peripheries.

Now even with modern production techniques and methods of production control and of product testing, it is possible for one article of a larger number of such articles, say in the present instance a rotor disc forging, to fail in use after a life considerably shorter than the average life or than the expected life, and it will be appreciated that where the article, such as a rotor disc forging, forms part of an aircraft engine such short life failure may result in serious damage and possibly also loss of life.

This invention has for an object to provide an improved turbine rotor disc structure in which the effect of short life failures is substantially minimised.

According to the present invention in one aspect, a rotor disc structure for carrying a row of rotor blades comprises at least three disc members, said members being forged and machined, secured together as a unit for assembly and adapted together to have in operation the desired characteristics of a rotor disc for the row of rotor blades, said disc members having such dimensions and there being such a number of said disc members that if one disc member should fail in service the load to which the other disc members will be subjected will be unlikely to cause them to fail. Preferably, each disc member of the structure is selected from a different production batch from each other disc member, and best results may be obtained by using materials from different manufacturers for the various disc members.

By a production batch of disc members is meant those disc members which undergo their final heat treatment at the same time.

By adoption of the invention the following advantage is obtained. Assume that the probability of a conventional solid forged disc being faulty is 1 in 1,000 discs; by a faulty disc is meant one in which a fault such as a fatigue crack develops during the life of the disc between strip inspections; and also assume that the equivalent disc structure of this invention comprises five disc members. If the probability of a faulty disc member is the same as that of a faulty conventional disc (say 1 in 1,000 as assumed above) then the probability that faults occur between strip inspections in two disc members of a rotor disc structure is approximately 1 in 100,000 discs.

On the other hand, it will be understood that if the probability of a disc member being faulty is the same as that for solid forged discs, i.e. 1 in 1,000 in accordance with the above assumption, then the probability is that 1 in 200 complete discs will contain a faulty disc member.

The discs will, however, be so designed that failure of one disc member, which will increase the stress in the other disc members by between 20% and 30% or less depending on the number of members, does not increase the stress in the remaining discs above the permissible value. In addition, in the case of a fatigue crack, the stress in the other disc members will only be increased locally due to the fact that the crack is localised because the stress in the faulty disc largely disappears when the crack opens up, the load being taken over by the other discs.

Thus, a fault developing in a single disc member of a disc structure may be detected by normal inspection routine or through the use of rough running detection devices, and need not be a source of danger provided that the proper precautions are taken for its detection. It will be understood that the normal inspection routine includes a thorough strip inspection, during which each disc member will be inspected individually, after a given number of running hours, which is usually of the order of 500 to 1,000 hours.

The probability of a catastrophic turbine disc failure is thus at least 100 times less than with the conventional disc and, since the likelihood of a fault coming in the same 36° arc of each of two disc members in the same disc is 10 to 1 against, the probability of catastrophic failure may be 1,000 times as unlikley.

According to the present invention in another aspect a rotor disc structure for carrying a row of rotor blades comprises at least three disc members secured together in the form of a stack, at least the two end disc members being of frusto-conical form over at least the inner part of their radius, and said disc members being formed with a first series of abutment surfaces adjacent their inner radius and with a second series of abutment surfaces between their inner radius and their outer periphery, and there are provided first and second bolting means to clamp the disc members together over their abutment surfaces.

The number of disc members will be chosen so that if one should fail in service, the increase of load to which the other disc members will be subjected will be unlikely to cause them to fail.

Preferably there will be at least five disc members, and in this case four of the disc members will preferably be of frusto-conical form over at least the inner part of their radius, and the central disc member will be of substantially symmetrical form. A similar arrangement is preferably adopted in any construction having an odd number of disc members.

In accordance with a preferred feature of this aspect of the invention, the end disc members are of frusto-conical form between the first and second series of abutment surfaces and are of substantially plane form between the second series of abutment surfaces and their periphery. It will be appreciated that the centrifugal effect during operation will tend to maintain the discs in the plane at right angles to their axis of rotation, and the disc members may be so dimensioned that in operation their outer peripheries tend to be held in abutment with one another due to centrifugal effect.

According to a feature of this invention, cooling fluid, for instance, cooling air, is supplied to between the disc members.

One embodiment of this invention will now be described as applied in a two-stage turbine such as might form part of an aircraft gas turbine propulsion engine, the description referring to the accompanying drawings, in which.

Figure 1:
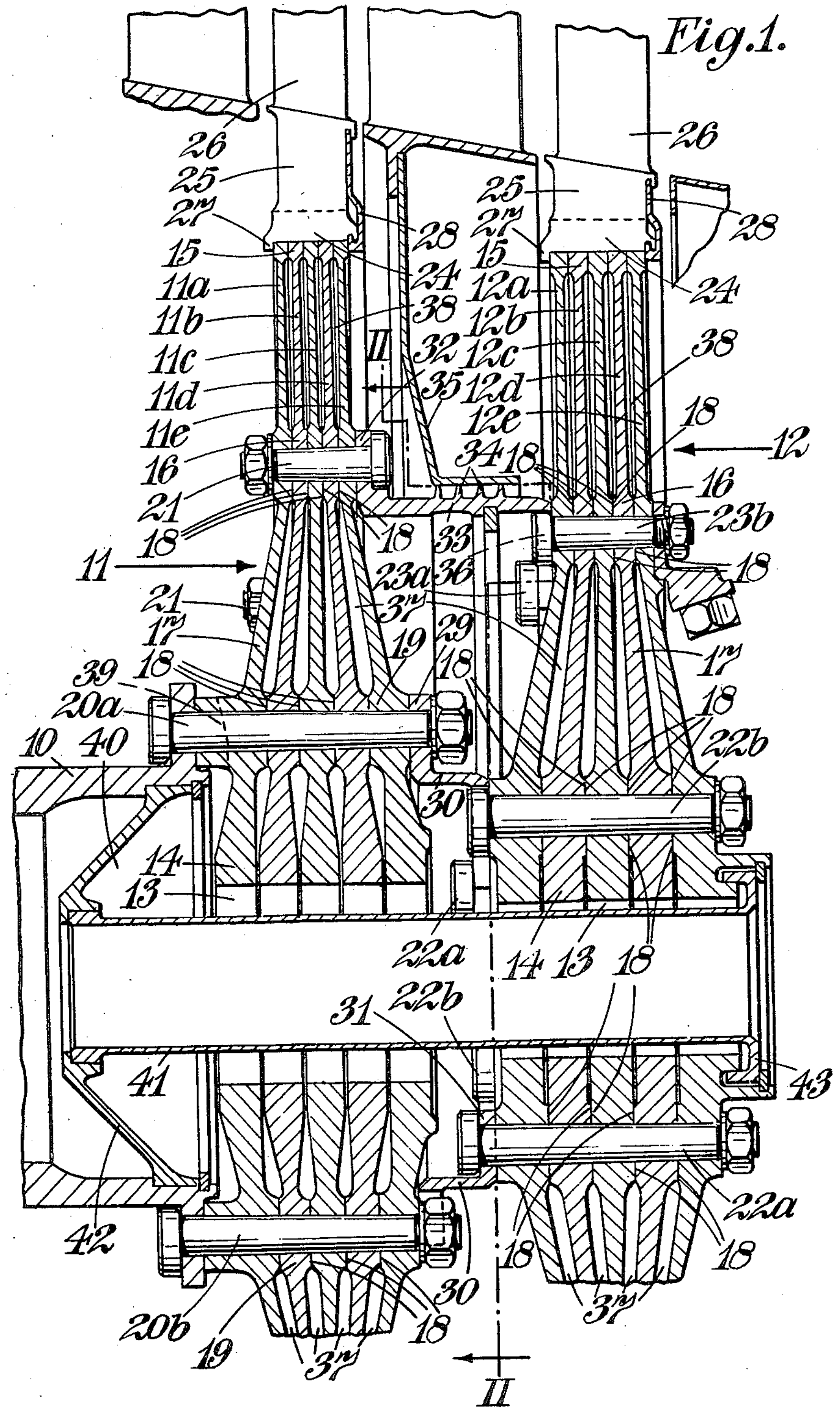
Figure 1 is an axial section through the turbine rotor.
Figure 2:
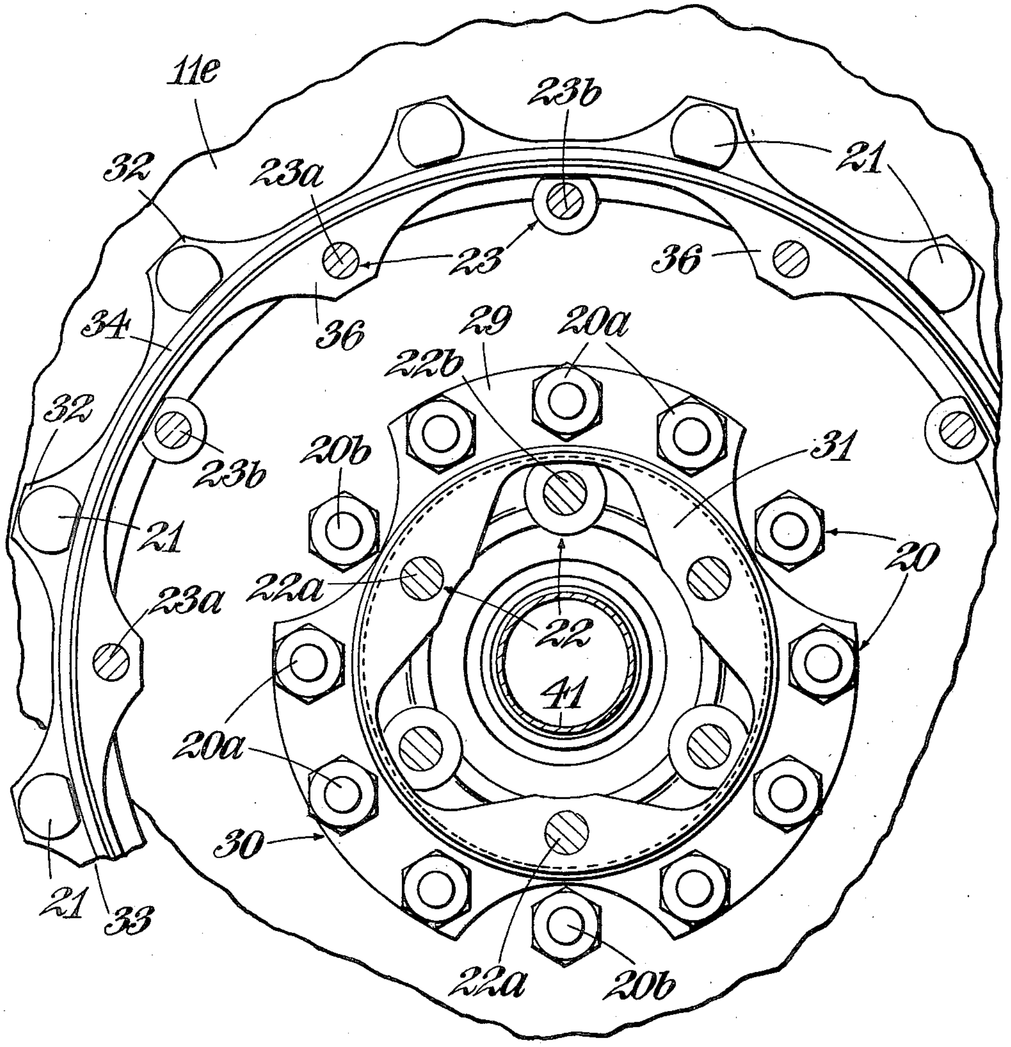
Figure 2 is a section on the line II—II of Figure 1.

The rotor of the turbine comprises a hollow main shaft 10 which has a flange at its downstream end to which is bolted a first disc structure 11 for the high-pressure stage rotor blades, there being connected to the first disc structure on its downstream side a second disc structure 12 to carry the low-pressure stage rotor blades.

The disc structures are alike in construction comprising five disc members 11_a–e_, 12_a–e_, each of which is of less thickness than a single forged disc for the same blades, and the disc members clamped together give a disc structure having characteristics suitable for carrying the blades.

Each disc member of the disc structures is of annular form having a central aperture 13 bounded by a first axially-thickened portion 14, a thickened outer peripheral rim 15 and a second axially-thickened portion 16 about radially mid-way between the first thickened portion 14 and the rim 15.

Each of the disc structures has its disc members arranged substantially symmetrically about a plane normal to the axis of rotation of the turbine. Thus each of the central disc members 11_c_, 12_c_, of the disc structure has its plane of symmetry in the plane just mentioned, the disc members 11_b_, 11_d_, 12_b_, 12_d_ adjacent the central disc member have their portions 17 radially inwardly of their second axially-thickened portions 16 of frusto-conical form, and the disc members 11_a_, 11_e_, 12_a_, 12_e_ at each end of the disc structure have their portions 17 inwardly of their second axially-thickened portions 16 of frusto-conical form and making a greater angle to the plane of symmetry of the disc structure than the disc members 11_b_, 11_d_, 12_b_, 12_d_ adjacent the central disc member.

Radially outwardly of their second axially-thickened portions 16 the disc members of both disc structures lie in planes substantially parallel to one another at right angles to the axis of rotation of the turbine.

The second axially-thickened portions 16 of the disc members of both disc structures 11, 12 and the first axially-thickened portions 14 of the disc members of the low-pressure turbine disc structure 12 are in the form of annular lands or a series of spaced circular bosses affording axially-facing abutment surfaces 18, and the disc members of the high-pressure turbine disc structure 11 are formed with annular lands or a series of spaced circular bosses 19 adjacent to, and radially outside their first axially-thickened portions 14 to afford similar axially-facing abutment surfaces 18.

Each disc structure 11, 12 has its discs clamped together by two sets of bolts 20, 21 and 22, 23 respectively. The bolts 20 extend through lands or bosses 19, the bolts 21 extend through the first annular lands or bosses 16 of the disc structure 11, the bolts 22 extend through the lands or bosses 14 of the disc structure 12 and the bolts 23 extend through lands or bosses 16 of the disc structure 12, whereby the abutment surfaces 18 are held in contact, but the rims 15 are maintained in abutment by centrifugal effects. The abutting rims have fir-tree slots 24 cut across them to receive fir-tree roots 25 of the rotor blades 26, and the blades are located axially in the slots for example by inwardly-directed nibs 27 at one end and by locking plates 28 at the other end which interlock with the rims and blade roots.

Certain of the bolts above referred to are also used to secure the turbine discs to one another through intermediate ring members, and to secure the high-pressure turbine disc to the shaft.

All the bolts are taper bolts.

The high-pressure disc structure 11 is secured to the flange on the shaft by the set of bolts 20, which are say twelve in number, passing through the lands or bosses 19 adjacent the first thickened portions 14 of its disc members 11_a–e_ and some 20_a_ of these bolts—say nine—also pass through a radially-outward flange 29 on a ring 30 abutting the downstream face of the disc structure, the flange being scalloped to pass inside the remaining bolts 20_b_.

This ring 30 has an inward flange 31 spaced downstream of the outward flange and the inward flange is also scalloped. Some 22_a_ of the bolts 22—say three of the total of six bolts—which pass through the first thickened portion 14 of the low-pressure disc structure 12, also pass through the inward flange 31 of the ring 30 so securing the low-pressure disc structure 12 to the high-pressure disc structure 11. The remainder 22_b_ of the bolts occupy the scalloped portions of the inward flange 31 and serve to hold the disc members 12_a–e_ of the disc structure together in assembly and dismantling.

The bolts 21 passing through the second thickened portion 16 of the high-pressure disc structure—which are say twelve in number—also pass through an outward flange 32 on a second ring member 33 which is formed externally with a series of axially-spaced circumferential ribs 34 so as to provide the rotating member of a labyrinth seal and the ribs co-operate with fixed structure 35 to complete the seal. The downstream edge of the seal member 33 is inwardly flanged at 36 and some 23_a_ of the bolts—any six of the total of twelve—which pass through the second thickened portions 16 of the low-pressure disc structure 12 pass through this flange 36 whilst the remainder 23_b_ do not. These other bolts 23_b_ serve to hold the disc members 12_a–e_ together at their mid-radius in assembly and dismantling, those 23_a_ which pass through the inward flange 36 on the seal member being removed in dismantling the turbine rotor.

Cavities 37, 38 are formed within the disc structures by providing the thickened portions on them, and these cavities are supplied with cooling air in the following manner. The air is passed radially inwards through channels 39 adjacent the thickened portion 14 of the upstream disc member 11_a_ of the high-pressure disc structure 11 to within a space 40 formed between the disc parts 14 and a hollow tubular member 41 extending through the two disc structures 11, 12 and supported coaxially with them by annular parts 42, 43, whereof the part 42 is secured internally of the hollow shaft 10 and receives the upstream end of the tubular member 41 and whereof the part 43 is a flange on the member 41 and has a spigoted engagement with the downstream disc member 12_e_ of the low-pressure disc structure. From the space 40 the cooling air flows outwardly, through passages provided in the first thickened portions 14 where they abut, and in the adjacent lands or bosses 19 in the case of the high-pressure disc, into the cavities 37 formed between the first and second thickened portions 14, 16 and then passes outwardly through channels in the second thickened portions 16 into cavities 38 radially between the second thickened portions 16 and the rims 15 of the disc members, whence the cooling air flows outwardly over the roots 25 of the turbine blades 26 into the working fluid passage of the turbine.

As stated above, in order to avoid the difficulties discussed above and to improve the life of the rotor disc structures, each of the disc members forming a disc structure is preferably selected from a different production batch of the disc members, and is preferably obtained from a different manufacturing concern so that the chance of a fault in one disc member appearing also in another disc member of the same rotor disc structure is minimised.

I claim:

1. A rotor disc structure comprising a pair of forged and machined end disc members, at least one intermediate forged and machined disc member arranged between said end disc members, at least the two end disc members having a dished radially inner part and a radially outer part, said radially inner part having a concave frusto-conical surface facing the intermediate disc member and a convex frusto-conical surface facing away from the intermediate disc member, and each of said disc members being formed with a first series of abutment surfaces at a first radial distance from their axes and with a second series of abutment surfaces spaced radially outwards from said first series of abutment surfaces and radially inwards of the peripheries of the disc members, first bolting means extending through the disc members at said first radial distance and releasably clamping the disc members together with the first series of abutment surfaces in contact, and second bolting means extending through the discs at the radius of said second series of abutment surfaces and releasably holding said second series of abutment surfaces in contact, said bolting means providing the sole means for securing the disc members together.

2. A rotor disc structure as claimed in claim 1 having an odd number of such disc members whereof the central disc member extends in the central plane of the disc structure and the remaining disc members are arranged equally on each side of the central disc member and are made frusto-conical at least over the portions thereof extending between said first and second abutment surfaces.

3. A rotor disc structure as claimed in claim 2, wherein the cone angle of the frusto-conical portions of the end disc members is greater than that of the next adjacent disc members.

4. A rotor disc structure as claimed in claim 1, wherein each disc member has third abutment surfaces at its peripheries through which it abuts adjacent discs, and wherein each disc member other than the central disc member is of frusto-conical form between its first and second series of abutment surfaces and is of substantially plane form between the second series of abutment surfaces and their periphery.

5. A rotor disc structure as claimed in claim 1, comprising also passages in the portions of the discs formed with the abutment surfaces providing flow paths for coolant from adjacent the center of the disc to spaces formed between the discs intermediate the abutment surfaces.

6. A rotor disc structure comprising an odd number of forged and machined disc members disposed side by side, each of said discs having at a first radial distance from the axis of the structure first axially-thickened portions projecting into contact with the corresponding portions on the adjacent disc members and having at a second and greater radial distance from the axis of the structure second axially-thickened portions projecting into contact with the corresponding portions of the adjacent disc members, the central disc member extending in a central plane of the structure, each of the disc members on each side of the central disc member of said odd number of disc members having a radially inner portion extending outwardly from its first axially-thickened portions to its second axially-thickened portions, which radially inner portion has a concave frusto-conical surface facing towards the central disc member and a convex frusto-conical surface facing away from the central disc member, and each of the disc members on each side of the central disc member having a radially outer part extending outwards from its second axially-thickened portions, said radially outer parts of the disc members being substantially parallel to one another, each of said disc members having an axially-thickened rim at its outer edge, first bolting means extending through the first axially-thickened portions of the disc members and releasably clamping the disc members together at said first radial distance, and second bolting means extending through the second axially-thickened portions of the disc members and releasably clamping the second axially-thickened portions in contact, said bolting means providing the sole means for securing the disc members together.

7. A rotor disc structure according to claim 6, comprising five such disc members, the cone angle of the radially inner parts of the two disc members next adjacent the central disc member having greater cone angles than the cone angles of the radially inner parts of the two disc members on the sides thereof remote from the central disc member.

References Cited in the file of this patent

UNITED STATES PATENTS

| | | |
|---|---|---|
| 874,398 | De Ferranti | Dec. 24, 1907 |
| 1,362,074 | Baumann | Dec. 14, 1920 |
| 2,657,008 | Atkinson | Oct. 27, 1953 |

FOREIGN PATENTS

| | | |
|---|---|---|
| 468,003 | Canada | Sept. 12, 1950 |
| 859,171 | Germany | Aug. 3, 1953 |